United States Patent
Stauffer et al.

(10) Patent No.: US 10,756,874 B2
(45) Date of Patent: Aug. 25, 2020

(54) BEAM SEARCH PILOTS FOR PAGING CHANNEL COMMUNICATIONS

(71) Applicant: Google LLC, Mountain View, CA (US)

(72) Inventors: Erik Richard Stauffer, Sunnyvale, CA (US); Jibing Wang, Saratoga, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/980,429

(22) Filed: May 15, 2018

(65) Prior Publication Data

US 2019/0356434 A1    Nov. 21, 2019

(51) Int. Cl.
| | | |
|---|---|---|
| *H04L 5/00* | (2006.01) | |
| *H04W 76/27* | (2018.01) | |
| *H04L 1/00* | (2006.01) | |
| *H04W 68/02* | (2009.01) | |
| *H04W 72/08* | (2009.01) | |

(52) U.S. Cl.
CPC ............ *H04L 5/006* (2013.01); *H04L 1/0026* (2013.01); *H04L 5/0051* (2013.01); *H04W 68/02* (2013.01); *H04W 72/08* (2013.01); *H04W 76/27* (2018.02)

(58) Field of Classification Search
None
See application file for complete search history.

(56) References Cited

U.S. PATENT DOCUMENTS

| | | |
|---|---|---|
| 7,428,420 B2 | 9/2008 | Lee |
| 8,233,428 B2 | 7/2012 | Ernstrom et al. |
| 2002/0094843 A1* | 7/2002 | Hunzinger ........... H01Q 3/2611 455/562.1 |
| 2005/0255892 A1* | 11/2005 | Wong .................. H04B 7/2606 455/562.1 |
| 2006/0193394 A1* | 8/2006 | Tanaka ................ H03G 3/3052 375/260 |
| 2008/0076436 A1* | 3/2008 | Sanders ............... H04W 76/15 455/450 |
| 2016/0173250 A1 | 6/2016 | Kang et al. |
| 2017/0367069 A1* | 12/2017 | Agiwal ................ H04B 7/0695 |

(Continued)

FOREIGN PATENT DOCUMENTS

| | | |
|---|---|---|
| EP | 1872487 | 1/2008 |
| EP | 3226437 | 10/2017 |

(Continued)

OTHER PUBLICATIONS

"International Search Report and Written Opinion", PCT Application No. PCT/US2019/013012, dated Apr. 30, 2019, 55 pages.

*Primary Examiner* — Hassan A Phillips
*Assistant Examiner* — Gautam Sharma
(74) *Attorney, Agent, or Firm* — Colby Nipper PLLC

(57) ABSTRACT

The present disclosure describes techniques and systems for beam search pilots for paging channel communications. In some aspects, a user device receives, from a base station of a wireless network, a beam search pilot on a beam. The user device determines that a signal quality of the beam search pilot meets a signal quality threshold. Based on this determination, the user device transmits, to the base station, an indication that the beam search pilot meets the signal quality threshold. The user device then receives a paging channel communication on the beam provided by the base station.

20 Claims, 8 Drawing Sheets

(56) References Cited

U.S. PATENT DOCUMENTS

| | | | |
|---|---|---|---|
| 2018/0027522 A1* | 1/2018 | Lee | H04W 68/02 |
| | | | 370/336 |
| 2018/0049244 A1* | 2/2018 | Lee | H04W 76/27 |
| 2018/0077680 A1* | 3/2018 | Tenny | H04W 16/28 |
| 2018/0115958 A1* | 4/2018 | Raghavan | H04B 7/0478 |
| 2018/0227900 A1* | 8/2018 | Akkarakaran | H04W 72/046 |
| 2019/0181941 A1* | 6/2019 | Kim | H04B 7/0695 |

FOREIGN PATENT DOCUMENTS

| | | |
|---|---|---|
| WO | 2015089894 | 6/2015 |
| WO | 2016168959 | 10/2016 |

* cited by examiner

BEAM SEARCH PILOTS FOR PAGING CHANNEL COMMUNICATIONS

BACKGROUND

A base station provides a cell of a wireless network by which to connect with associated user devices. When a user device is in a connected state, the user device and the base station actively communicate. For example, when a user instructs the user device to download or upload data over the wireless network, the user device and the base station actively communicate. Alternatively, when the user device is in an idle state or an inactive state (e.g., when the user device is not in use), the user device and the base station do not actively communicate. However, when a user device is in an idle or inactive state, the base station may have data to transmit to the user device, such as application data pushed to the user device. Because the user device is not actively communicating with the base station, the user device relies on a paging process to receive the data from the base station.

Conventional paging techniques for cellular networks require the user device to wake up from an idle or inactive mode to periodically attempt to detect a paging channel communication. When the user device detects a paging channel communication, the user device attempts to decode the paging channel communication to determine if data is intended for the user device. However, recent advances to wireless communication technology present challenges to the conventional paging techniques for cellular networks.

SUMMARY

This document describes techniques for, and systems that enable, beam search pilots for paging channel communications. These techniques may include waking-up a user device to receive a beam search pilot from a base station prior to receiving a paging channel communication (or "page"). The user device may receive multiple beam search pilots over a communication resource, such as a single orthogonal frequency-division multiplexing (OFDM) symbol or a single slot. The multiple beam search pilots may be transmitted over multiple beams, with each beam having a direction relative to the base station. The user device then compares signal qualities of the multiple beam search pilots with a signal quality threshold. If a beam search pilot meets the signal quality threshold, the user device can transmit an indication to the base station that identifies the beam search pilot as being transmitted on a preferred beam for receiving a page. The indication is used by the base station to select a beam for transmitting the page to the user device. For the purposes of this discussion, a signal quality that exceeds the signal quality threshold is considered to meet the signal quality threshold.

In some aspects, a user device receives, from a base station of a wireless network, a beam search pilot on a beam. The beam is provided by the base station at a direction relative to the base station. The user device determines that a signal quality of the beam search pilot meets a signal quality threshold. For example, the user device may compare a signal to noise ratio (SNR) of the beam search pilot to a threshold SNR for receiving a page. The user device transmits, to the base station, an indication that the beam search pilot meets the signal quality threshold. The user device then receives a paging channel communication on the beam provided by the base station at the direction relative to the base station.

In other aspects, a user device includes a processor, a hardware-based transceiver, and a computer-readable storage medium comprising instructions executable by the processor. Responsive to execution of the instructions by the processor, the processor performs operations relating to beam search pilots. The operations include receiving, from a base station and via the hardware-based transceiver, a schedule of communication resources for receiving beam search pilots from the base station. The operations also include identifying, within a communication resource of the scheduled communication resources, a beam search pilot of the beam search pilots having a signal quality that meets a signal quality threshold. The beam search pilot is received from the base station on a beam of the wireless network. The operations further include transmitting, to the base station and via the hardware-based transceiver, an indication that the beam search pilot has a signal quality that meets the signal quality threshold. The operations then include receiving, from the base station and via the hardware-based transceiver, a paging channel communication on the beam of the wireless network.

In further aspects, a base station includes a processor, one or more hardware-based transceivers, and a computer-readable storage medium comprising instructions executable by the processor. Responsive to execution of the instructions by the processor, the processor performs operations relating to beam search pilots. The operations include transmitting, to a user device and via the one or more hardware-based transceivers, multiple beam search pilots on multiple beams, respectively. The operations also include receiving, from the user device and via the one or more hardware-based transceivers, an indication that a signal quality of a beam search pilot of the multiple beam search pilots meets a signal quality threshold. The beam search pilot is transmitted on a beam of the multiple beams. The operations further include transmitting, to the user device and via the one or more hardware-based transceivers, a paging channel communication on the beam of the multiple beams.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of beam search pilots for paging channel communications are described below. The use of the same reference numbers in different instances in the description and the figures indicate similar elements.

DETAILED DESCRIPTION

Figure 1:
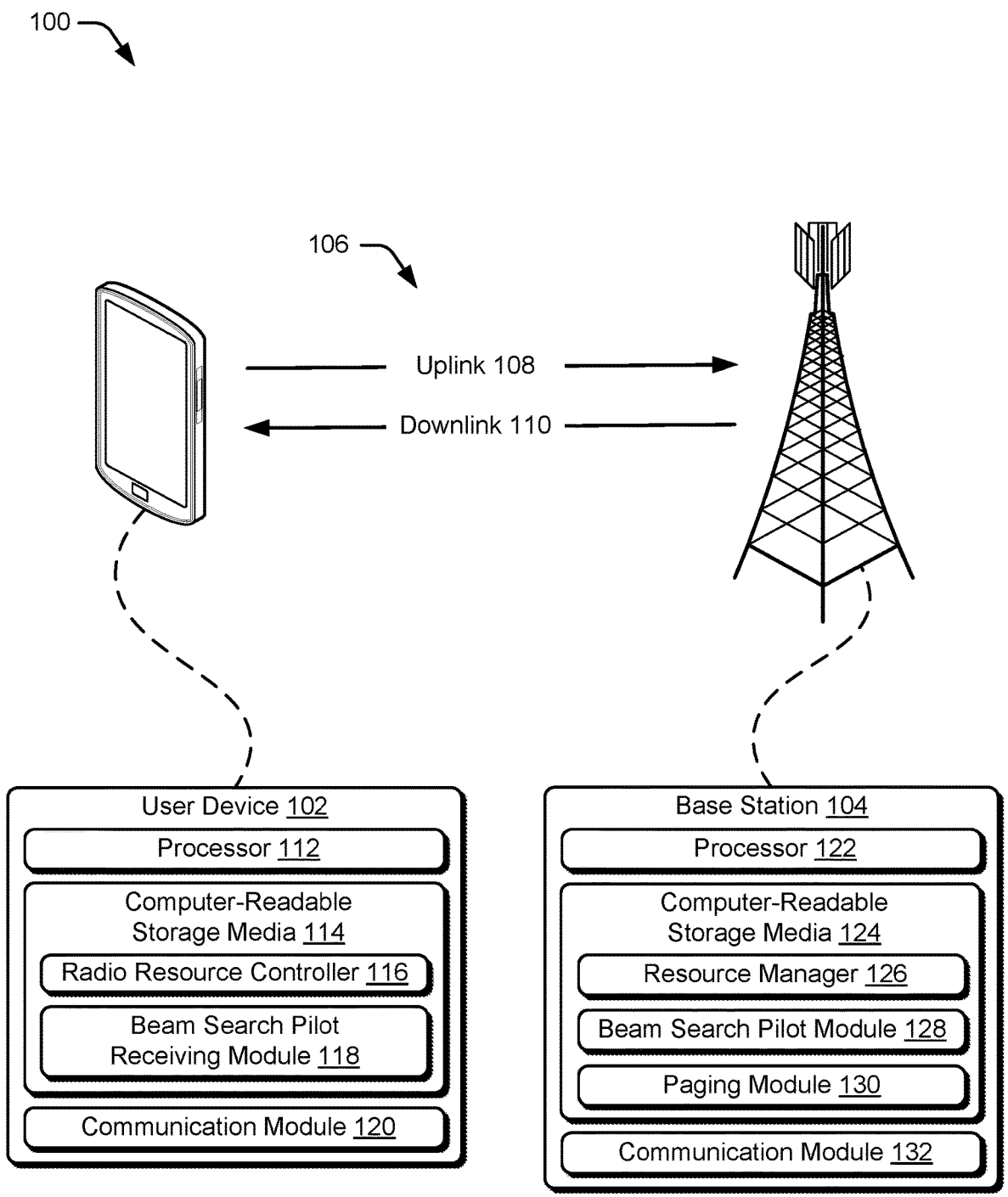
FIG. 1 illustrates an example operating environment in which beam search pilots for paging channel communications can be implemented.

With advances in wireless communication technology, base stations are able to provide wireless connections with user devices using high-frequency communication channels, such as those used by 5G NR wireless networks. High-frequency transmissions over these communication channels can have a relatively high susceptibility to fading, interference, and reflection. Therefore, base stations that provide wireless connections using high-frequency communication channels may use beamforming techniques to extend a range of the high-frequency transmissions. Beamforming techniques may also allow for multiple potential beam paths for communications between a base station and a user device. However, it is important for the base station to know where to direct a beam to allow the user device to receive data over the beam. When the user device is in a connected state, the base station can modify the beam, based on recent communications, to improve or maintain a signal quality of transmission over the beam. However, when transmitting a page to a user device in an idle state or an inactive state, the base station may select an ineffective beam (e.g., one having a low signal quality) to transmit the page, based on changes since a previous successful communication. For example, a previously-effective beam may become ineffective if the user device has moved outside the beam or an object obstructs the path of the beam. If the user device does not receive the page, it may be unable to receive data transmitted from the base station.

This document describes techniques and systems for using beam search pilots for paging channel communications. Beam search pilots can be transmitted before a page is transmitted to assist the base station in selecting a beam for transmitting the page. In this way, the beam search pilots can improve a likelihood that a user device receives and properly decodes a page from the base station.

In an illustrative implementation, a user device and a base station establish a wireless connection. As part of communication on the wireless connection, the base station and the user device agree on a beam search pilot schedule to use if the user device enters a radio resource control-idle (RRC-idle) mode or a radio resource control-inactive (RRC-inactive) mode. The user device engages in downloading and uploading application data while a user is active on the user device. When the user becomes inactive on the user device, the user device enters the RRC-idle mode, in which the user device is not actively communicating with the base station. While in the RRC-idle mode, the user device periodically, and according to the agreed beam search pilot schedule, attempts to detect beam search pilots. When the user device detects a beam search pilot with a signal quality above a signal quality threshold, the user device transmits an indication to the base station. After receiving the indication, the base station can transmit a page on a beam over which the search pilot was transmitted. These techniques allow the base station to increase a likelihood of transmitting a page over an effective beam for transmitting to the user device. These techniques also allow the user device to provide feedback to improve a likelihood of receiving a page from the base station.

The following discussion describes an operating environment and techniques that may be employed in the operating environment and/or network environment. In the context of the present disclosure, reference is made to the operating environment or networking environment by way of example only.

Operating Environment

FIG. 1 illustrates an example operating environment 100 in which beam search pilots for paging channel communications can be implemented. In this example, the operating environment includes a user device 102 (or "user equipment" or "UE") and a base station 104, which are respectively configured to communicate over a wireless connection 106 of a wireless network. Generally, the wireless connection 106 includes an uplink 108 by which the user device 102 transmits data to the base station 104 and a downlink 110 by which the base station 104 transmits other data to the user device 102, such as downlink beam pilots and pages. However, in some implementations, the wireless connection 106 may include only one of the uplink 108 or the downlink 110. Although shown or described with reference to a separate uplink 108 or downlink 110, communication between the user device 102 and the base station 104 may also be referenced as a wireless association, a frame exchange, a wireless link, or a communication link.

The wireless connection 106 may be implemented in accordance with any suitable protocol or standard, such as a Global System for Mobile Communications (GSM), Worldwide Interoperability for Microwave Access (WiMax), a High Speed Packet Access (HSPA), Evolved HSPA (HSPA+) protocol, a long-term evolution (LTE) protocol, an LTE Advanced protocol, a $5^{th}$ Generation (5G) New Radio (NR) protocol, or a future advanced protocol. The protocol may operate based on frequency division duplexing (FDD) or time division duplexing (TDD). The wireless connection 106 may operate over a high bandwidth, such as a bandwidth greater than 1 GHz. Further, the wireless connection 106 may be configured to allow for operation at high frequencies, such as frequencies above 3 GHz, as well as lower frequencies, such as those between 0.5 GHz and 3 GHz. More specifically, the wireless connection 106 may be configured to operate in a millimeter wave-frequency range.

The user device 102 includes a processor 112, computer-readable storage media (CRM) 114 having a radio resource controller 116 and a beam search pilot receiving module 118, and a communication module 120. The user device 102 is illustrated as a smart phone, however the user device 102 may instead be implemented as any device with wireless communication capabilities, such as a mobile gaming console, a tablet, a laptop, an advanced driver assistance system (ADAS), a point-of-sale (POS) terminal, a health monitoring device, an unmanned aircraft, a camera, a media-streaming dongle, a wearable smart-device, an internet-of-things (IoT) device, a personal media device, a navigation device, a mobile-internet device (MID), a wireless hotspot, a femto-cell, a smart vehicle, or a broadband router.

The processor 112 of the user device 102 can execute processor-executable instructions or code stored by the CRM 114 to cause the user device 102 to perform operations or implement various device functionalities. In this example, the CRM 114 also stores processor-executable code or instructions for implementing one or more of the radio resource controller 116 or the beam search pilot receiving module 118 of the user device 102.

A processor, such as the processor 112, can be implemented as an application processor (e.g., multicore processor) or a system-on-chip with other components of the user device 102 integrated therein. A CRM, such as the CRM 114, may include any suitable type of memory media or storage media, such as read-only memory (ROM), programmable ROM (PROM), random access memory (RAM), static RAM (SRAM), or Flash memory. In the context of this discussion, a CRM is implemented as hardware-based storage media, which does not include transitory signals or carrier waves. In some cases, a CRM stores one or more of firmware, an operating system, or applications of an associated device as instructions, code, or information. The instructions or code can be executed by an associated processor to implement various functionalities of the associated device, such as those related to network communication.

In some aspects, the radio resource controller 116 identifies an RRC mode (RRC state) of the user device 102. For example, the radio resource controller 116 may identify the RRC mode as an RRC-connected mode, an RRC-inactive mode, or an RRC-idle mode. In some implementations, an RRC-connected mode indicates that the user device 102 is actively communicating, requesting grants for communicating, or waiting for responsive communications from the base station 104. The user device 102 may enter an RRC-inactive mode from an RRC-connected mode after a defined amount of time elapses from a most recent communication. After an additional amount of time elapses without communication, the user device 102 may enter an RRC-idle mode. The user device 102 may identify the RRC mode autonomously or based on instructions from the base station 104. If the user device identifies the RRC mode autonomously, the user device 102 may transmit a notification of the RRC mode to the base station 104 via the communication module 120.

The beam search pilot receiving module 118 agrees with the base station 104 on a schedule for beam search pilots. In some implementations, the base station 104 transmits the schedule for beam search pilots to the user device 102 without input from the user device 102. In other implementations, one of the base station 104 or the user device 102 transmits a proposed schedule for beam search pilots and the other provides feedback, such as a confirmation or a rejection of the proposed schedule for beam search pilots.

When the user device 102 enters an RRC-idle mode or an RRC-inactive mode, the beam search pilot receiving module 118 attempts to detect beam search pilots that are transmitted by the base station 104 over communication resources indicated in the schedule. The beam search pilot receiving module 118 determines signal qualities of detected beam search pilots and compares the signal qualities with a signal quality threshold. For example, the signal quality threshold may be a minimum SNR for receiving a page. The beam search pilot receiving module 118 may also compare signal qualities of the detected beam search pilots to determine a beam search pilot having a highest signal quality. The beam search pilot receiving module 118 may select a beam search pilot or an associated beam over which the beam search pilot was transmitted. The selection may be based on the beam search pilot being a first beam search pilot to have a signal quality that meets the signal quality threshold or based on the beam search pilot having a highest signal quality of the detected beam search pilots.

Based on the selection by the beam search pilot receiving module 118, the user device 102 uses the communication module 120 to transmit an indication that the beam search pilot meets the signal quality threshold. The user device 102 may provide the indication by identifying a characteristic of the beam search pilot, by identifying the associated beam, or by transmitting the indication after an agreed upon time interval following reception of the beam search pilot. For example, the indication may include a key or other identifier included in the beam search pilot. An associated beam may be identified by the user device 102 by transmitting the indication along a path of the associated beam to the base station 104. The user device 102 may transmit the indication during a following communication resource at a time within the following communication resource that corresponds to a time at which the beam search pilot is received within the scheduled communication resource.

The communication module 120 of the user device 102 includes a hardware-based transceiver and associated circuitry, software, or other components for wirelessly communicating with the base station 104. The communication module 120 includes one or more of antennas, a radio frequency (RF) front end, an LTE transceiver, or a 5G NR transceiver for communicating with base station 104 or other base stations. The RF front end of the communication module 120 can couple or connect one or both of the LTE transceiver or the 5G NR transceiver to the antennas to facilitate various types of wireless communication. The antennas of the communication module 120 may include an array of multiple antennas that are configured similarly to or differently from each other. The antennas and the RF front end can be tunable to one or more frequency bands defined by the 3GPP LTE or 5G NR communication standards and implemented by one or both of the LTE transceiver or the 5G NR transceiver. By way of example and not limitation, the antennas and the RF front end can be implemented for operation in sub-gigahertz bands, sub-6 GHZ bands, and/or above 6 GHz bands that are defined by the 3GPP LTE or 5G NR communication standards. Alternatively, the 5G NR transceiver may be replaced with a 5G NR receiver.

The communication module 120 may transmit, via a transmitter of the transceiver, data to the base station 104 via one or more radio frequency channels of the uplink 108, such as a physical random access channel (PRACH), a physical uplink control channel (PUCCH), or a physical uplink share channel (PUSCH). This data transmitted to the base station 104 may include any suitable type of framed or packetized information, such as the indication that the search beam pilot meets the signal quality threshold, an uplink control information (UCI) communication, an RRC message, a sounding reference signal (SRS), a PRACH communication, device status information, wireless connection status information, wireless connection control information, data requests, application data, or network access requests. The communication module 120 may also receive, via a receiver of the transceiver, other data from the base station 104 over one or more channels of the downlink 110, such as a physical downlink control channel (PDCCH), a physical downlink share channel (PDSCH), a paging channel, or a physical hybrid automatic repeat request (HARQ) indicator channel (PHICH). The other data may include one or more of application data, a page, downlink pilots, primary or secondary synchronization signals (PSSs or SSSs), a master information block (MIB), a system information block (SIB), a downlink control information (DCI) communication, an RRC message, a downlink grant, an uplink grant, wireless connection configuration settings, network control information, or a communication mode selection.

In this example, the base station 104 is shown generally as a cellular base station of a wireless network. The base station 104 may be implemented to provide and manage a cell of a wireless network that includes multiple other base stations that each manage another respective cell of the wireless network. As such, the base station 104 may communicate with a network management entity or others of the multiple base stations to coordinate connectivity, cell-management, or hand-offs of mobile stations within or across the cells of the wireless network.

The base station 104 can be configured as any suitable type of base station or network management node, such as a GSM base station (e.g., a Base Transceiver Station, a BTS), a node base (Node B) transceiver station (e.g., for UMTS), an Evolved Universal Terrestrial Radio Access Network Node B (E-UTRAN Node B, evolved Node B, eNodeB, eNB, e.g., for LTE), or a Next Generation Node B (gNode B, or gNB, e.g., for 5G NR). As such, the base station 104 may control or configure parameters of the uplink 108 or the downlink 110 in accordance with one or more of the wireless standards or protocols described herein.

The base station 104 includes a processor 122, a computer-readable storage media (CRM) 124, and a communications module. The CRM 124 includes a resource manager 126, a beam search pilot module 128, and a paging module 130. In this example, the CRM 124 also stores processor-executable code or instructions for implementing the resource manager 126, the beam search pilot module 128, and the paging module 130 of the base station 104.

In some aspects, the resource manager 126 of the base station 104 is implemented to perform various functions associated with allocating physical access (e.g., resource blocks) or communication resources for the air interface of the base station 104. The air interface of the base station 104, may be partitioned or divided into various units (e.g., frames, subframes, or slots) of one or more of bandwidth, time, symbols, or spatial layers. For example, within a framework of a 5G NR protocol, the resource manager 126 can allocate bandwidth and time intervals of access in resource blocks, each of which may be allocated in whole, or in part, to one or more channels for communicating with the user device 102. As discussed above, the channels may include one or more of a PRACH, a PUCCH, a PUSCH, a PDCCH, a PDSCH, a PHICH, or a paging channel. The resource blocks may include multiple subcarriers that each span a portion of a frequency domain of the resource blocks. The subcarriers may be further divided into resource elements, or OFDM symbols, that each span a portion of a time domain of the subcarriers. Consequently, a resource block includes multiple OFDM symbols that can be grouped into subcarriers with other OFDM symbols having a common frequency bandwidth.

In some aspects, the beam search pilot module 128 determines a schedule for transmitting beam search pilots to user devices, such as the user device 102. The schedule may be different for each user device, groups of user devices, or each beam provided by the base station 104. Alternatively, the schedule may be a same schedule for the entire cell provided by the base station 104. In some implementations, the beam search pilot module 128 uses data related to a prior communication with the user device 102 to predict beams that will have a signal quality that meets a signal quality threshold. The beam search pilot module 128 may predict beams based on directions, relative to the base station 104, of a beam path of the beams. The beam search pilot module 128 causes the communication module 132 to transmit beam search pilots on the predicted beams and based on the schedule. After the beam search pilot module 128 causes the communication module 132 to transmit the beam search pilots, the base station 104 waits for the indication from the user device 102.

In some aspects, the paging module 130 manages a paging channel of the cell. The paging module 130 uses paging to transmit a notification to the user device 102 when the user device 102 is in an RRC-inactive mode or an RRC-idle mode. Based on the indication from the user device 102, the paging module 130 determines a beam for transmitting a page over the paging channel. The page is then transmitted via the communication module 132. The data of the page may include, for example, a notification of an incoming phone call, application push data, or an emergency broadcast.

The communication module 132 includes a hardware-based transceiver and associated circuitry, software, or other components for wirelessly communicating with the user device 102. The communication module 132 may be configured to communicate over a frequency range of the wireless medium and over multiple spatial layers and beams. In some cases, the communication module 132 includes, or is coupled with, multiple hardware-based transceivers and antenna arrays that are configured to establish and manage wireless connections with multiple user devices via one or more beams. The base station 104 may transmit any suitable data or information to the user device 102 through the downlink 110, such as the beam search pilots, the page, the schedule of beam search pilots, other downlink pilots, a schedule of allocated communication resources, application data, wireless connection-status information, or wireless connection-control information.

Figure 2:
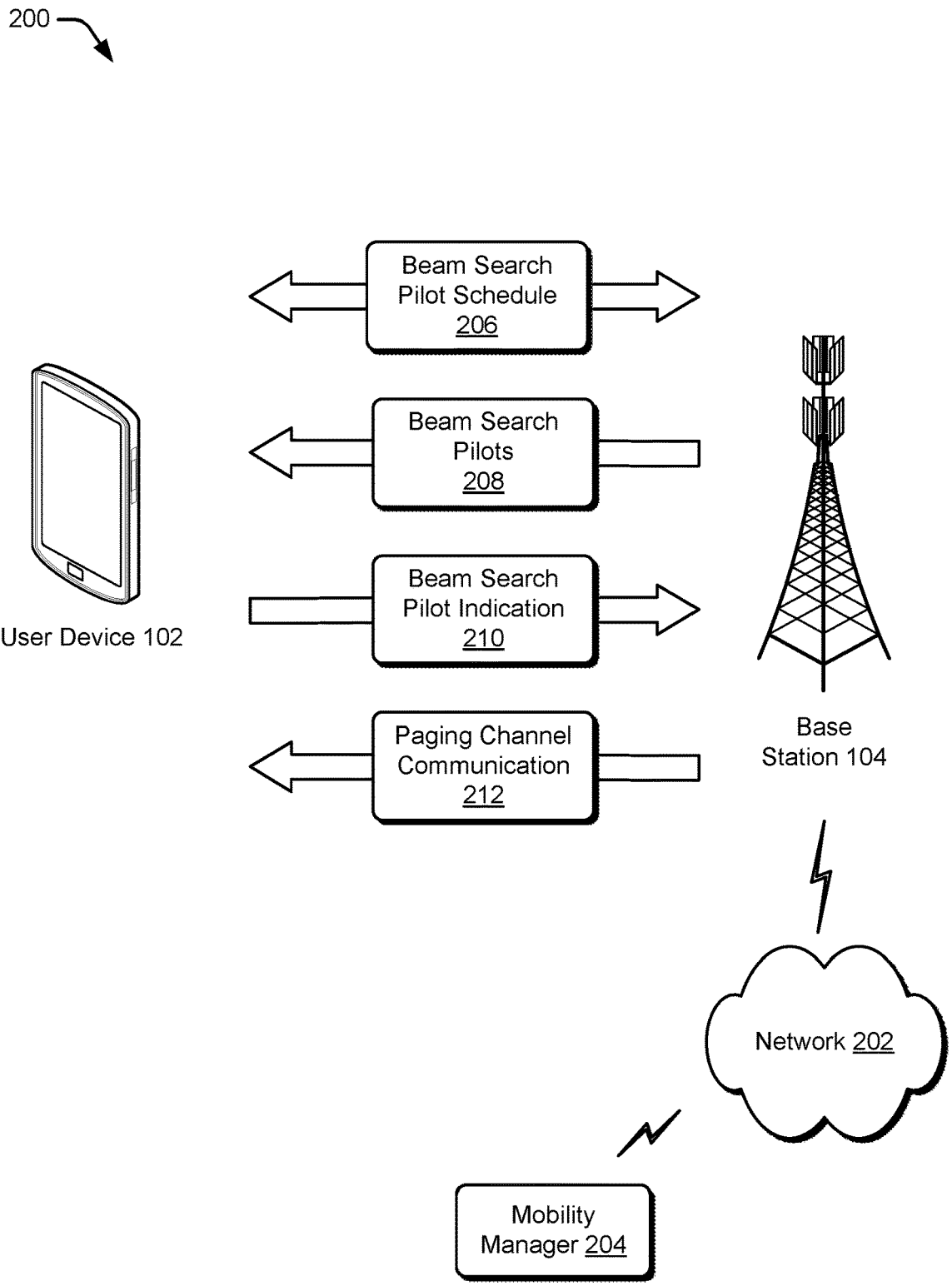
FIG. 2 illustrates an example operating environment in which the user device and base station may communicate in accordance with one or more aspects of beam search pilots for paging channel communications.

FIG. 2 illustrates an example networking environment 200 in which a user device and a base station may communicate in accordance with one or more aspects of beam search pilots for paging channel communications. The network environment includes respective instances of the user device 102 and the base station 104, which provides a wireless network with which the user device 102 and other user devices may wirelessly connect. Through the wireless network, the base station 104 may enable or provide access to other networks or resources, such as a network 202 (e.g., the Internet) connected via a backhaul link (e.g., fiber network). Additionally or alternately, the networking environment 200 may include other base stations or a mobility manager 204, such as a mobility management entity (MME) or an access and mobility management function (AMF), to provide and manage an area wide wireless network, such as a 5G NR network and associated data services.

In this example, the user device 102 and the base station 104 agree upon a beam search pilot schedule 206. This scheduling may be accomplished by the base station 104 transmitting the beam search pilot schedule 206 to the user device 102 during an RRC-active mode communication. The user device may transmit an acknowledgement of the beam search pilot schedule 206 transmitted by the base station 104. Alternatively, the user device 102 may propose the beam search pilot schedule 206 in a transmission to the base station 104. This agreement may be made via one or more RRC communications, a SIB communication, or a MIB communication.

The base station 104 transmits beam search pilots 208 toward the user device 102 over a paging channel. The beam search pilots 208 may include multiple beam search pilots 208, or multiple sets of beam search pilots 208, on different beams having different directions relative to the base station 104. The base station 104 may select the multiple beams based on one or more of a predicted location of the user device 102 or expected conditions at the user device 102. The predicted location and expected conditions may be based on one or more previous communications with the user device 102. The base station 104 may further identify communication resources over which the user device 102 is scheduled to respond to the beam search pilots 208. This identification may be transmitted, for example, via an RRC message or along with the agreed upon beam search pilot schedule 206.

The user device 102 determines if one of the beam search pilots 208 has a signal quality that meets a signal quality threshold. The user device 102 then transmits a beam search pilot indication 210. The beam search pilot indication 210 identifies one or both of a beam search pilot with a signal quality that meets the signal quality threshold or an associated beam over which the beam search pilot was transmitted. The user device 102 may transmit the beam search pilot indication 210 over a PRACH communication or a PUCCH communication, such as an uplink control information (UCI) message.

Alternatively, the user device 102 may transmit the beam search pilot indication 210 over a supplemental uplink carrier. The supplemental uplink carrier may use a same radio access technology (RAT) as the wireless connection, such as 5G NR. Alternatively, the supplemental uplink carrier uses another RAT, such as LTE. A supplemental uplink carrier may be beneficial for transmitting the beam search pilot indication 210 based on the supplemental uplink carrier being located at a relatively low frequency, which can reduce a required transmission power and increase a range of the transmission. For example, the wireless connection 106 operates, at least partially, in a millimeter wave-frequency range and the supplemental uplink carrier operates in a frequency range below 3 GHz.

Based on the beam search pilot indication 210, the base station 104 determines a beam for transmitting a paging channel communication 212 to the user device 102. The base station 104 then transmits the paging channel communication 212 to the user device 102. The base station 104 may transmit the paging channel communication 212 at a time that depends on when the base station 104 receives the beam search pilot indication 210. Alternatively, the base station 104 may transmit the paging channel communication 212 after a predetermined time interval that is defined in the beam search pilot schedule 206 or in an indication within an RRC message.

Figure 3:
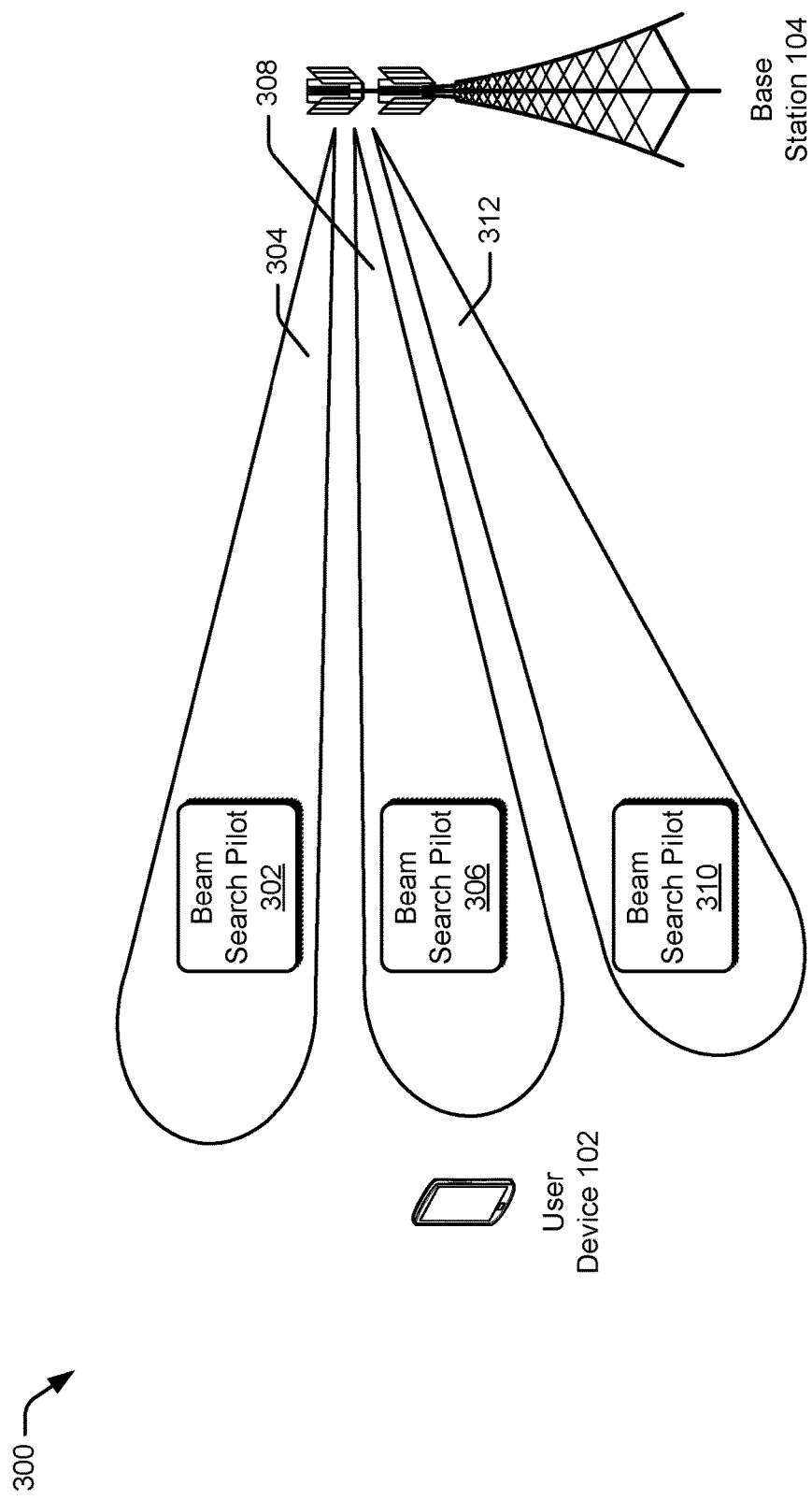
FIG. 3 illustrates an example operating environment including beams within a cell of the wireless network provided by the base station in accordance with one or more aspects of beam search pilots for paging channel communications.

FIG. 3 illustrates an example networking environment 300 including beams within a cell of the wireless network provided by the base station in accordance with one or more aspects of beam search pilots for paging channel communications. The networking environment 300 includes respective instances of the user device 102 and the base station 104.

The base station 104 transmits a beam search pilot 302 on a beam 304, a beam search pilot 306 over a beam 308, and a beam search pilot 310 over a beam 312. Although the beams 304, 308, and 312 are illustrated as having mutually exclusive beam locations, the beams 304, 308, and 312 may overlap each other or one or more other beams of the cell provided by the base station 104. Additionally, one or more of the beams 304, 308, and 312 may have an indirect beam path to the user device 102. For example, a beam may reflect off an object to arrive at the user device 102.

As discussed above, the beams 304, 308, and 312 may be selected for transmitting the beam search pilots 302, 306, and 310 based on a predicted location of the user device 102 or an expected environment at the user device 102. As illustrated, the beam 308 appears to be most likely to carry a beam search pilot that has a signal quality that meets a signal quality threshold, but an object may obstruct the beam 308 from reaching the user device 102 with a signal quality that meets a signal quality threshold.

The user device 102 determines a signal quality of some or all of the beam search pilots 302, 306, and 310. This may result in the user device 102 determining that one of the beam search pilots 302 or 310 has a signal quality that is greater than or equal to a signal quality of the beam search pilot 306 and the other of the beam search pilots 302 or 310. The user device 102 may select the beam search pilot 302, 306, or 310 based on a comparison of their respective signal qualities. Alternatively, the user device 102 may select a first detected beam search pilot having a signal quality that meets the signal quality threshold, regardless of which of the beam search pilots 302, 306, or 310 has a highest signal quality. The user device 102 then transmits the beam search pilot indication 210 that identifies the selected beam search pilot 302, 306, or 310 or an associated beam 304, 308, or 312.

Figure 4:
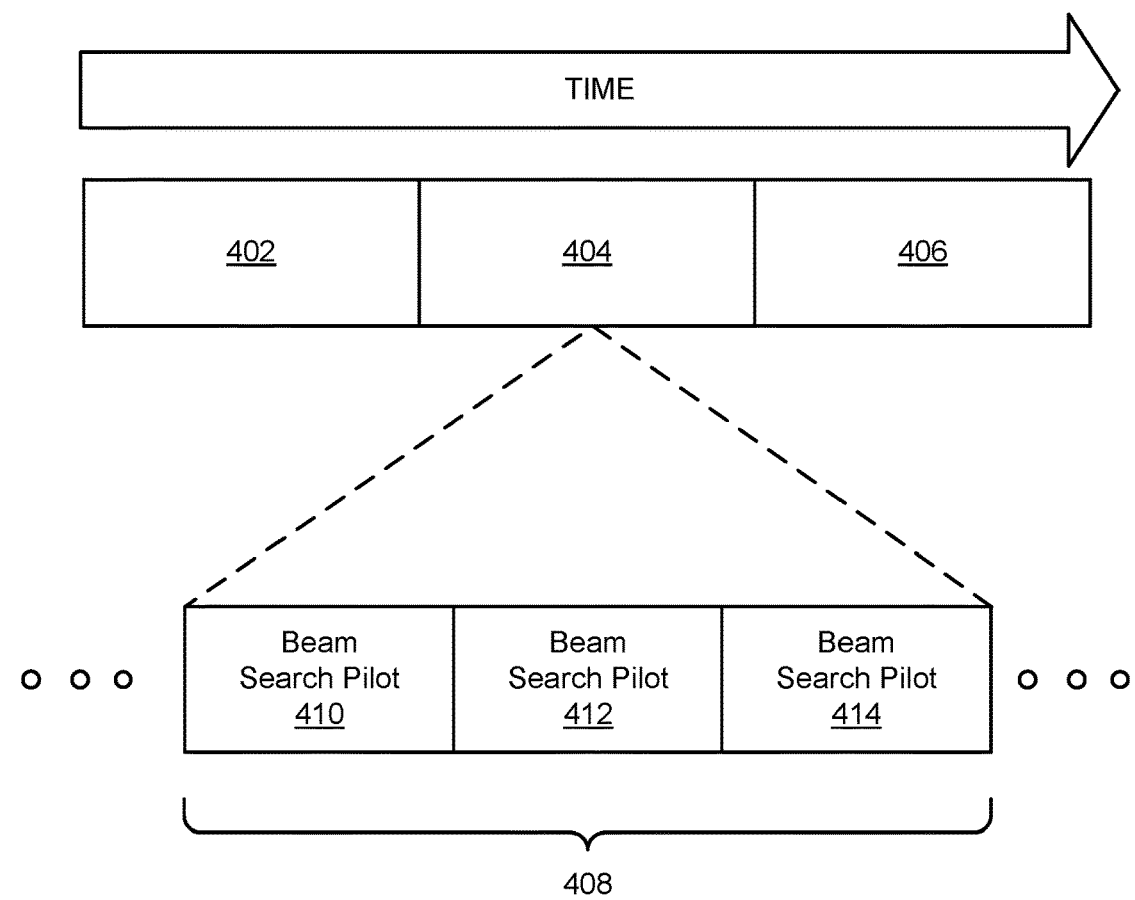
FIG. 4 illustrates example communication resources, in a time domain, over which beam search pilots can be transmitted to the user device.

FIG. 4 illustrates example resources 400 over which beam search pilots can be transmitted to the user device. The resources 400 include communication resources 402, 404 and 406, which may be data frames, subframes, slots, or resource blocks of the wireless connection 106. The communication resource 404 includes other communication resources, or sub-resources, such as the communication resource 408. The communication resource 408 may be, for example, a single resource element, OFDM symbol, or slot within the communication resource 404.

The communication resource 408 includes portions of the communication resource 404, spaced in a time domain, over which beam search pilots 410, 412, and 414 are transmitted by the base station 104. By transmitting the beam search pilots 410, 412, and 414 sequentially, the base station 104 may use timing of the beam search pilot indication 210 to identify which of the beam search pilots 410, 412, and 414 has a signal quality that meets a signal quality threshold. For example, the user device 102 can transmit the beam search pilot indication 210 after an agreed interval of time after receiving a beam search pilot that has a signal quality that meets a signal quality threshold. The base station 104 may determine, based on the time of the transmission, which beam search pilot was transmitted to the user device 102 at the agreed interval of time before the transmission. For example, the user device 102 may transmit the beam search pilot indication 210 during a following communication resource at a time within the following communication resource that corresponds to a time at which the user device 102 received the beam search pilot.

Additionally, when the communication resource 408 represents a single OFDM symbol, the user device 102 can attempt to detect the beam search pilots 410, 412, and 414 for a relatively short duration of time, which can conserve battery power of the user device 102. Further, the base station 104 can use fewer communication resources to transmit the beam search pilots 410, 412, and 414, which can make additional communication resources available for paging other user devices or otherwise communication over the available communication resources.

Figure 5:
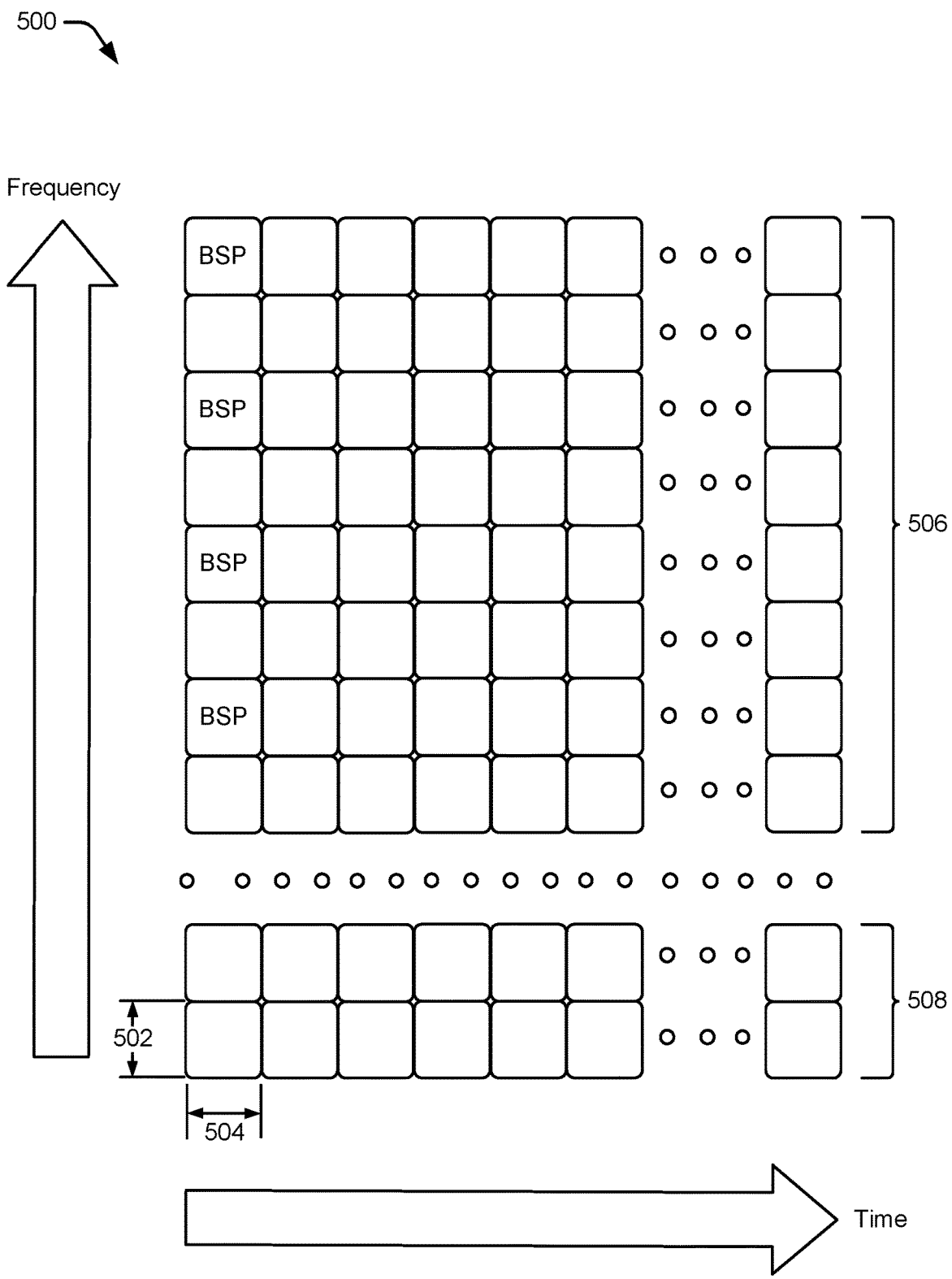
FIG. 5 illustrates other example communication resources, in a time-frequency domain, over which the base station can transmit beam search pilots to the user device.

FIG. 5 illustrates other example communication resources 500, in a time-frequency domain, over which the base station 104 can transmit beam search pilots to the user device 102. Each of the communication resources 500 span a frequency bandwidth 502 and a time duration 504. The communication resources, shown as boxes, may be resource blocks, groups of resource blocks, resource elements, groups of resource elements that are a subset of a resource block, or other denominations of communication resources. A frequency bandwidth 506 is allocated by the base station 104 to a paging channel for transmitting pages to the user device 102 when in an RRC-inactive mode or an RRC-idle mode. Several of the communication resources within the frequency bandwidth 506 are labeled with "BSP" to indicate that the communication resources are scheduled for transmitting one or more beam search pilots. The communication resources labeled as BSP may include multiple beams search pilots, such as the communication resource 408.

As illustrated, the beam search pilots can be transmitted over communication resources within the frequency bandwidth 506 that is allocated for the paging channel. This allows the user device 102 to determine a signal quality of the beam search pilots at a frequency that will be used to transmit the page. The beam search pilots may be transmitted throughout portions of the frequency bandwidth 506, all of the communication resources of the frequency bandwidth 506, or only a single communication resource of the frequency bandwidth 506.

A frequency bandwidth 508 represents a supplemental uplink operated on resources apart from the frequency bandwidth 506 and other frequencies used for the wireless connection 106. The supplemental uplink may be a part of the wireless connection 106, another portion of the wireless network provided by the base station 104, or a portion of an uplink carrier operating under a radio access technology that is different from the wireless connection 106. In some instances, the user device 102 may enter an RRC-idle mode or an RRC-inactive mode to preserve power for the user device 102. However, transmitting the beam search pilot indication 210 can consume power of the user device 102, and thereby reduce an effectiveness of the user device 102 to preserve power. For these or other reasons, the user device 102 may benefit from transmitting the beam search pilot indication 210 over communication resources at relatively low frequencies that are lower than a frequency bandwidth 506 over which the user device receives the beam search pilot.

Techniques for Beam Search Pilots

Figure 6:
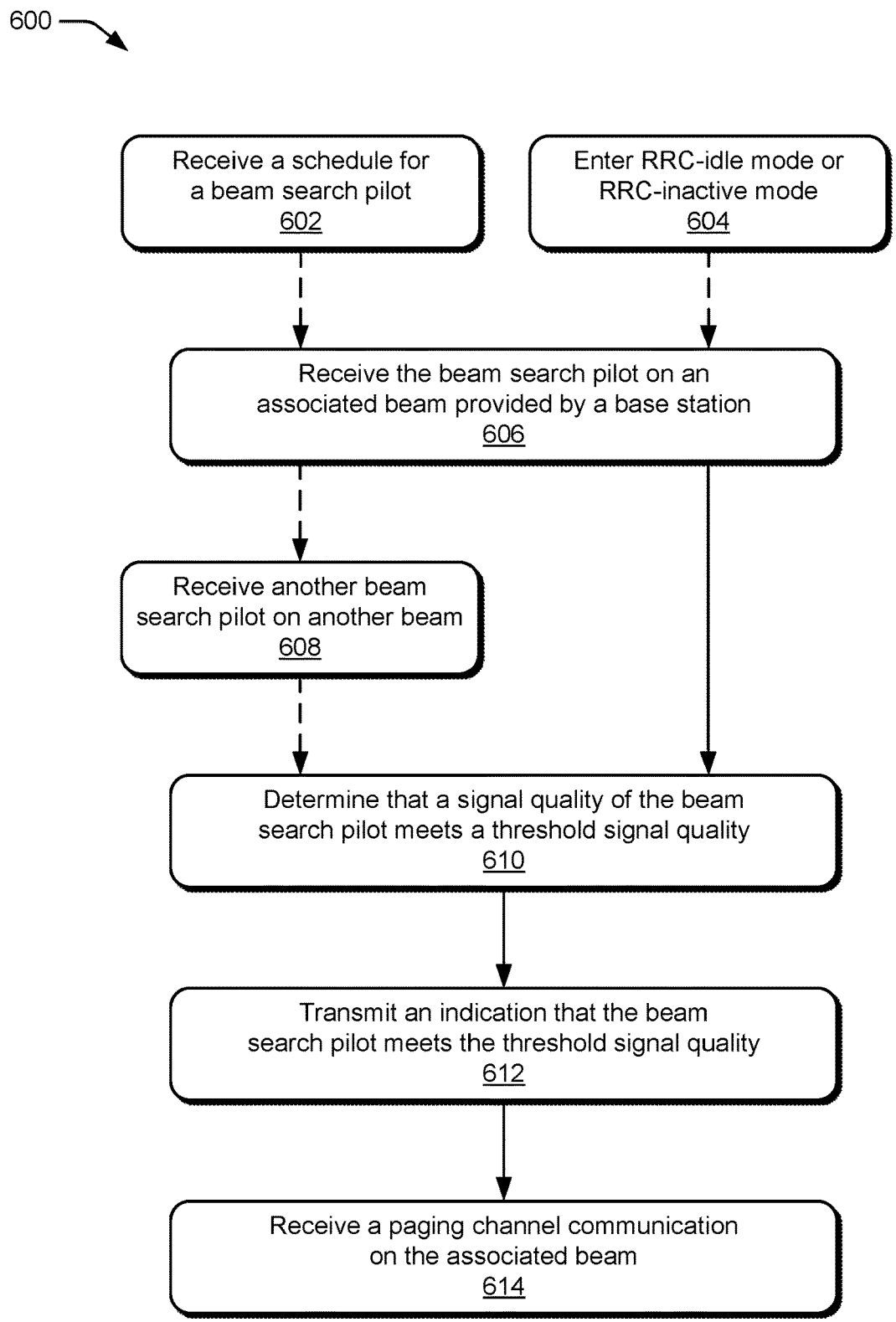
FIG. 6 illustrates an example method performed by the user device for beam search pilots for paging channel communications.
Figure 7:
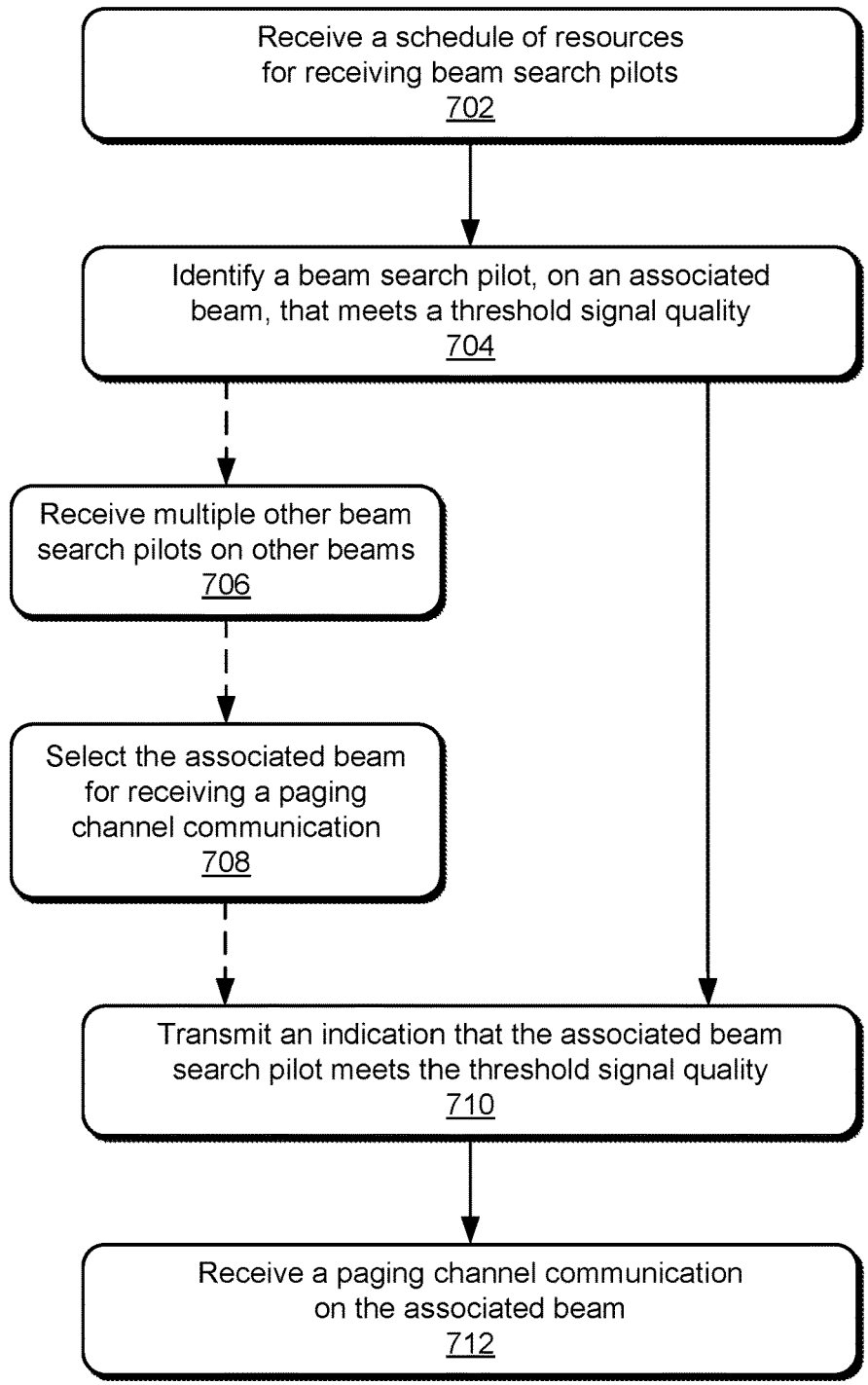
FIG. 7 illustrates another example method performed by the user device for beam search pilots for paging channel communications.
Figure 8:
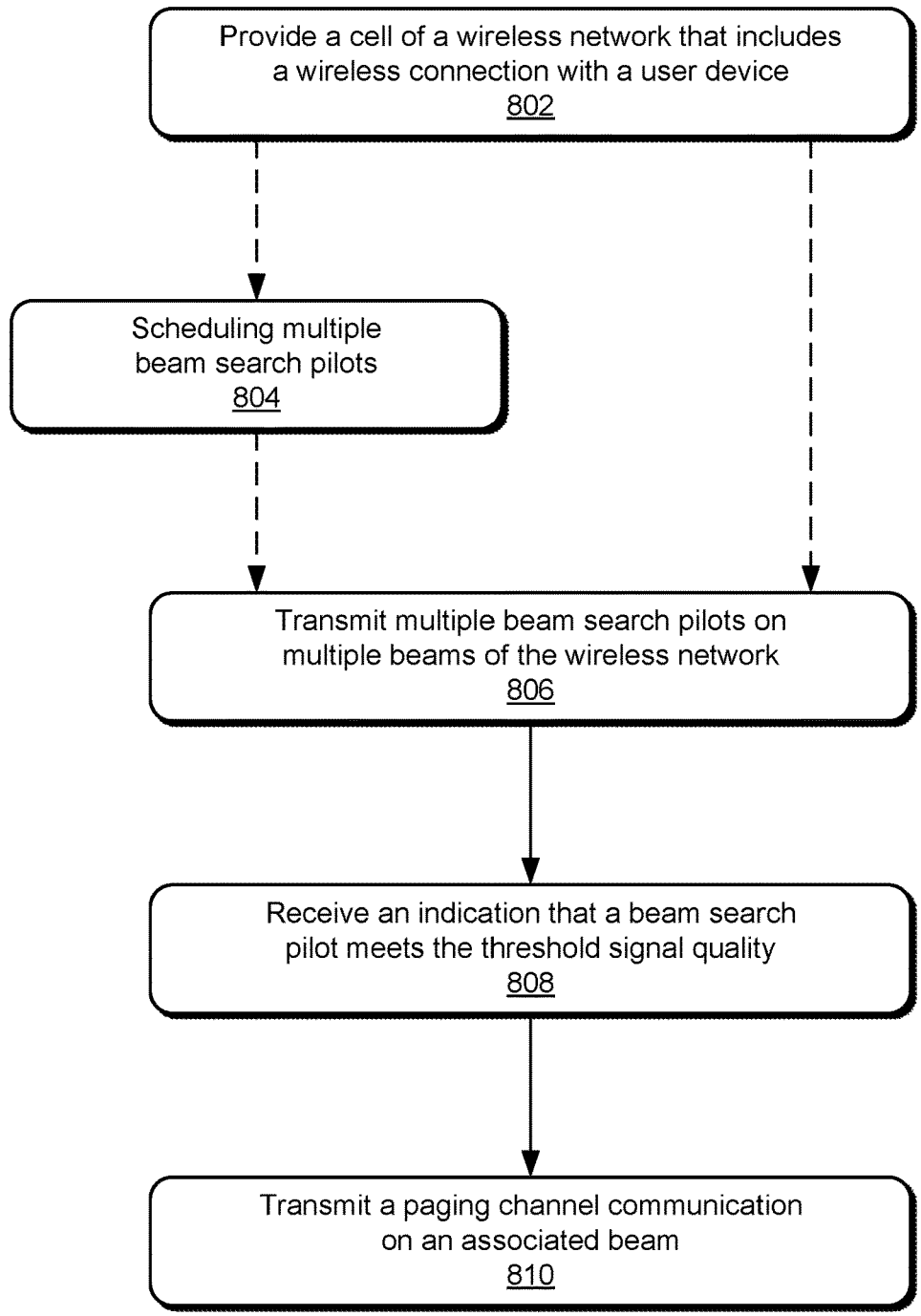
FIG. 8 illustrates an example method performed by the base station for beam search pilots for paging channel communications.

FIGS. 6-8 depict methods for implementing beam search pilots for paging channel communications. These methods are shown as sets of blocks that specify operations performed but are not necessarily limited to the order or combinations shown for performing the operations by the respective blocks. For example, operations of different methods may be combined, in any order, to implement alternate methods without departing from the concepts described herein. In portions of the following discussion, the techniques may be described in reference to FIGS. 1-5, reference to which is made for example only. Generally, any of the components, modules, methods, and operations described herein can be implemented using software, firmware, hardware (e.g., fixed logic circuitry), manual processing, or any combination thereof. The techniques are not limited to performance by one entity or multiple entities operating on one device, or those described in these figures.

FIG. 6 illustrates an example method 600 performed by a user device for implementing beam search pilots for paging channel communications. The method 600 includes operations that may be performed by a radio resource controller, such as the radio resource controller 116, a beam search pilot receiving module, such as the beam search pilot receiving module 118, and a communication module, such as the communication module 120. In some aspects, operations of the method 600 may increase a likelihood that a user device receives a paging channel communication by transmitting feedback of beam signal qualities prior to receiving the paging channel communication.

At optional operation 602, the user device receives a schedule for a beam search pilot. For example, the user device 102 receives the beam search pilot schedule 206 from the base station 104. The user device 102 may receive the beam search pilot schedule 206 upon establishing the wireless connection 106 or before entering an RRC-idle mode or an RRC-inactive mode.

At optional operation 604, the user device enters an RRC-idle mode or an RRC-inactive mode. For example, the user device 102 enters the RRC-idle mode or the RRC-inactive mode based on non-use of the user device 102 for an interval of time, failing to communicate with the base station 104 for an interval of time, or a failure to maintain the wireless connection 106 between the user device 102 and the base station 104.

At operation 606, the user device receives the beam search pilot on an associated beam that is provided by a base station of a wireless network. For example, the user device 102 receives the beam search pilot 306 on the beam 308 that has a direction relative to the base station 104 that is different from the directions of the beams 304 and 312.

At optional operation 608, the user device receives another beam search pilot on another beam. For example, the user device 102 receives the beam search pilot 310 on the beam 312. Additionally, the user device 102 may receive the other beam search pilot before or after the beam search pilot and within a same communication resource, such as the beam search pilots 410, 412, and 414.

At operation 610 the user device determines that a signal quality of the beam search pilot meets a signal quality threshold. For example, the beam search pilot receiving module 118 determines that the beam search pilot 306 has an SNR that meets a threshold for receiving and decoding a page from the base station 104. In implementations including the optional operation 608, the user device 102 may select the beam search pilot 306 based on having a signal quality that is greater than a signal quality of the other beam search pilot 310. Alternatively, the user device 102 may select the beam search pilot 306 based on being the first beam search pilot having a signal quality that meets a signal quality threshold.

At operation 612, the user device transmits an indication that the beam search pilot meets the signal quality threshold. For example, the user device 102 transmits the beam search pilot indication 210 to the base station 104. The indication may identify the beam search pilot, the associated beam, or both.

At operation 614, the user device receives a paging channel communication on the associated beam. The associated beam is provided by the base station at the direction relative to the base station. For example, the user device 102 receives the paging channel communication 212 from the base station 104 over the beam 308 that was determined in the frequency bandwidth 506. The paging channel communication may include a request to enter an RRC-connected mode to facilitate additional transmissions of data from the base station 104.

FIG. 7 illustrates an example method 700 performed by a user device for implementing beam search pilots for paging channel communications. The method 700 includes operations that may be performed by a Radio Resource Control mode module, such as the radio resource controller 116, a beam search pilot receiving module, such as the beam search pilot receiving module 118, and a communication module, such as the communication module 120. In some aspects, operations of the method 700 allows a user device to provide feedback to a base station for selecting a beam over which the base station will transmit a paging channel communication.

At operation 702, the user device receives a schedule of communication resources for a beam search pilot. The user device receives the schedule from a base station that provides a cell of a wireless network. For example, the user device 102 receives the beam search pilot schedule 206 from the base station 104. The beam search pilot schedule 206 may identify periodic time intervals during which beam search pilots will be transmitted to the user device 102 if the user device 102 is in an RRC-idle mode or an RRC-inactive mode. The beam search pilot schedule 206 may also identify a frequency of the scheduled communication resources.

At operation 704, the user device identifies, within a communication resource of the scheduled communication resources, a beam search pilot having a signal quality that meets a signal quality threshold. The beam search pilot is received from the base station on an associated beam transmitted by the base station. For example, the beam search pilot receiving module 118 determines that the beam search pilot 306 has an SNR that meets a threshold for receiving and decoding a page from the base station 104.

At optional operation 706, the user device receives multiple other beam search pilots on other beams. For example, the user device 102 receives the beam search pilots 302 and 310 on the beams 304 and 312, respectively.

At optional operation 708, the user device selects the associated beam for receiving a paging channel communication. For example, the beam search pilot receiving module 118 may determine which beam to indicate in the beam search pilot indication 210. This may be based on a highest signal quality of the beam search pilots or on a first beam search pilot to have a signal quality that meets the signal quality threshold.

At operation 710, the user device transmits an indication that the beam search pilot meets the signal quality threshold. For example, the user device 102 transmits the beam search pilot indication 210 to the base station 104. The indication may identify one or more of the beam search pilot or the beam associated with the beam search pilot. The indication may be made based on a beam on which the indication is transmitted to the base station 104, a timing of the transmission of the indication, or an identification of a characteristic of the beam search pilot, such as a key or other identifier.

At operation 712, the user device receives a paging channel communication, on the associated beam, transmitted by the base station. The base station transmits the beam at the direction relative to the base station. For example, the user device 102 receives the paging channel communication 212 from the base station 104 over the beam 304 and in the frequency bandwidth 506.

FIG. 8 illustrates an example method 800 performed by a base station for implementing beam search pilots for paging channel communications. The method 800 includes operations that may be performed by a resource manager, a beam search pilot module, a paging module, and a communication module. For example, the method 800 may be performed by one or more of the resource manager 126, the beam search pilot module 128, a paging module 130, or a communication module 132. In some aspects, operations of the method 800 may increase a likelihood that a base station will successfully select a beam for transmitting a paging channel communication to a user device.

At optional operation 802, the base station provides, via one or more hardware-based transceivers, a cell of a wireless network. The cell includes a wireless connection with a user device. For example, the base station 104 provides a cell of a wireless network that includes the wireless connection 106 with the user device 102. Additionally or alternatively, the base station 104 may provide the cell of the wireless network along with another base station or the mobility manager 204.

At optional operation 804, the base station schedules one or more communication resources over which multiple beam search pilots are to be transmitted. For example, the base station 104 transmits the beam search pilot schedule 206 to the user device 102. The beam search pilot schedule 206 may be transmitted as part of a MIB communication, a SIB communication, or an RRC message. Further, the beam search pilot schedule 206 may be unique to the user device 102, shared with other user devices on a same beam, or shared with all user devices associated with the base station 104.

At operation 806, the base station transmits, to the user device and via the one or more hardware-based transceivers, the multiple beam search pilots on multiple beams of the wireless network. For example the base station 104 transmits the beam search pilots 410, 412, and 414 on associated beams of the wireless network. The base station 104 may select the beams 304, 308, and 312 for transmitting the beam search pilots 302, 306, and 310 based on a predicted location of the user device 102. The prediction may be made based on one or more recent locations of the user device 102 or feedback on a previous transmission of beam search pilots from the user device 102.

At operation 808, the base station receives, from the user device and via the one or more hardware-based transceivers, an indication that a signal quality of a beam search pilot meets a signal quality threshold. For example, the base station 104 receives the beam search pilot indication 210 from the user device 102. The beam search pilot indication 210 indicates that a signal quality of the beam search pilot 306 meets a signal quality threshold for receiving a page.

At operation 810, the base station transmits, to the user device and via the one or more hardware-based transceivers, a paging channel communication on an associated beam. The associated beam is a beam over which the beam search pilot having the signal quality that meets the signal quality threshold was transmitted. For example, the base station 104 transmits the paging channel communication 212 to user device 102 over the beam 308 based on the beam search pilot 306 having a signal quality that meets a signal quality threshold. Further, the base station 104 may transmit the paging channel communication 212 over a same frequency bandwidth as the beam search pilot.

Although techniques using, and apparatuses for implementing, beam search pilots for paging channel communications have been described in language specific to features and/or methods, it is to be understood that the subject of the appended claims is not necessarily limited to the specific features or methods described. Rather, the specific features and methods are disclosed as example ways in which beam search pilots can be implemented.

What is claimed is:

1. A method performed by a user device for using beam search pilots for a paging channel communication, the method comprising:
    entering one of a radio resource control-idle (RRC-idle) mode or a radio resource control-inactive (RRC-inactive) mode;
    while in the RRC-idle mode or RRC-inactive mode, receiving, from a base station of a wireless network, a beam search pilot schedule that indicates communication resources for receiving the beam search pilots from the base station;
    receiving a beam search pilot on an associated beam transmitted by the base station over at least one of the communication resources indicated by the beam search pilot schedule;
    determining that a signal quality of the received beam search pilot meets a signal quality threshold;
    transmitting, to the base station, an indication that the received beam search pilot meets the signal quality threshold; and
    receiving, from the base station and based on the transmission of the indication, a paging channel communication on the associated beam.

2. The method as recited in claim 1, further comprising receiving another beam search pilot on another beam transmitted by the base station, the other beam having a direction that is different from a direction of the associated beam.

3. The method as recited in claim 2, further comprising determining that another signal quality of the other beam search pilot does not meet the signal quality threshold.

4. The method as recited in claim 2, further comprising selecting the beam for receiving the paging channel communication, the selection based on the signal quality of the beam search pilot being greater than another signal quality of the other beam search pilot.

5. The method as recited in claim 2, wherein the user device receives the beam search pilot and the other beam search pilot in a same orthogonal frequency-division multiplexing (OFDM) symbol.

6. The method as recited in claim 5, wherein the beam search pilot and the other beam search pilot are spaced, in a time domain, within the OFDM symbol.

7. The method as recited in claim 1, wherein the user device transmits the indication over a frequency bandwidth that is spaced, in a frequency domain, from the beam search pilot.

8. The method as recited in claim 1, wherein the user device transmits the indication over a supplemental uplink.

9. The method as recited in claim 1, wherein transmitting the indication that the received beam search pilot meets the signal quality threshold further comprises;
    indicating that the received beam search pilot meets the signal quality threshold based on a beam used to transmit the indication.

10. The method as recited in claim 1, wherein transmitting the indication comprises:
    transmitting the indication on a communication resource that corresponds to a time of said receiving the beam search pilot.

11. The method as recited in claim 1, wherein receiving the beam search pilot comprises receiving the beam search pilot as part of multiple beam search pilots, and
    wherein determining that the signal quality of the received beam search pilot meets the signal quality threshold comprises:
        selecting a first detected beam search pilot, out of the multiple beam search pilots, having the signal quality that meets the signal quality threshold as the received beam search pilot.

12. A user device comprising:
    a processor;
    a hardware-based transceiver; and
    a computer-readable storage medium comprising instructions executable by the processor to configure the processor to:
        enter one of a radio resource control-idle (RRC-idle) mode or a radio resource control-inactive (RRC-inactive) mode;
        while in the RRC-idle mode or RRC-inactive mode, receive, from a base station and using the hardware-based transceiver, a beam search pilot schedule that indicates communication resources for receiving beam search pilots from the base station;
        identify, within a communication resource identified by the beam search pilot schedule, a beam search pilot of the beam search pilots having a signal quality that meets a signal quality threshold, the beam search pilot received from the base station on a beam;
        transmit, to the base station and using the hardware-based transceiver, an indication that the beam search pilot has a signal quality that meets the signal quality threshold; and
        receive, from the base station and using the hardware-based transceiver, a paging channel communication on the beam of the wireless network.

13. The user device as recited in claim 12, wherein the instructions are executable by the processor to configure the processor to transmit the indication by using a beam that indicates the beam search pilot has the signal quality meets the signal quality threshold.

14. The user device as recited in claim 12, wherein the instructions are executable by the processor to configure the processor to receive multiple other beam search pilots on multiple other beams of the wireless network.

15. The user device as recited in claim 14, wherein the instructions are executable by the processor to configure the processor to select the beam for the reception of the paging channel communication, wherein the selection is based on the identification that the beam search pilot has a signal quality that meets the signal quality threshold before an identification that another beam search pilot of the multiple other beam search pilots has a signal quality that meets the signal quality threshold.

16. The user device as recited in claim 14, wherein the instructions are executable by the processor to configure the processor to select the beam for the reception of the paging channel communication, wherein the selection is based on the beam search pilot having a signal quality that is greater than or equal to a signal quality of multiple other beam search pilots.

17. The user device as recited in claim 12, wherein the transmission of the indication includes the transmission of the indication over one of a physical random access channel or a physical uplink control channel.

18. A base station comprising:
    a processor;
    one or more hardware-based transceivers; and
    a computer-readable storage medium comprising instructions executable by the processor to configure the processor to:
        detect, prior to the transmission of the multiple beam search pilots, that the user device has entered one of a radio resource control-idle (RRC-idle) mode or a radio resource control-inactive (RRC-inactive) mode;

transmit, to the user device and using the one or more hardware-based transceivers and while the user devices is in the RRC-idle mode or RRC-inactive mode, a beam search pilot schedule that indicates communication resources for receiving beam search pilots from the base station;

transmit, to the user device and via the one or more hardware-based transceivers, multiple beam search pilots on multiple beams, respectively, over the communication resources indicated by the beam search pilot schedule;

receive, from the user device and in response to the transmission, an indication that a signal quality of a beam search pilot of the multiple beam search pilots meets a signal quality threshold, the beam search pilot having been transmitted on a beam of the multiple beams; and transmit, to the user device and via the one or more hardware-based transceivers, a paging channel communication on the beam of the multiple beams.

19. The base station as recited in claim 18, wherein the instructions are executable by the processor to configure the processor to receive the indication that the signal quality of the beam search pilot meets the signal quality threshold based on a beam used to receive the indication.

20. The base station as recited in claim 18, wherein the instructions are executable by the processor to configure the processor to select the multiple beams for the transmission of the multiple beam search pilots, the selection based on a previous communication with the user device.

* * * * *

UNITED STATES PATENT AND TRADEMARK OFFICE
CERTIFICATE OF CORRECTION

PATENT NO. : 10,756,874 B2
APPLICATION NO. : 15/980429
DATED : August 25, 2020
INVENTOR(S) : Erik Richard Stauffer and Jibing Wang Page 1 of 1

It is certified that error appears in the above-identified patent and that said Letters Patent is hereby corrected as shown below:

In the Claims

Column 15, Lines 52-53, after "further" before "indicating" delete "comprises;" insert --comprises:--

Signed and Sealed this
Sixth Day of October, 2020

Andrei Iancu
*Director of the United States Patent and Trademark Office*